United States Patent
Rodgers

(10) Patent No.: US 7,222,584 B1
(45) Date of Patent: May 29, 2007

(54) RAKE SHIELD FOR AUTOMATED LITTER BOXES

(75) Inventor: William T. Rodgers, 2895 Peyton Rd., La Verne, CA (US) 91750

(73) Assignee: William T. Rodgers, LaVerne, CA (US)

( * ) Notice: Subject to any disclaimer, the term of this patent is extended or adjusted under 35 U.S.C. 154(b) by 0 days.

(21) Appl. No.: 11/411,373

(22) Filed: Apr. 25, 2006

(51) Int. Cl.
*A01K 29/00* (2006.01)
(52) U.S. Cl. ........................... 119/166; 119/165
(58) Field of Classification Search ............... 119/166, 119/165, 161–163, 168
See application file for complete search history.

(56) References Cited

U.S. PATENT DOCUMENTS

| 5,107,797 | A | | 4/1992 | LaRoche |
| 5,259,340 | A | * | 11/1993 | Arbogast ............... 119/166 |
| 5,477,812 | A | | 12/1995 | Waters |
| 6,205,954 | B1 | * | 3/2001 | Bogaerts ............... 119/166 |
| 6,863,026 | B2 | | 3/2005 | Northrop et al. |
| 6,928,956 | B2 | * | 8/2005 | Parr ...................... 119/166 |

* cited by examiner

*Primary Examiner*—Son T. Nguyen

(57) ABSTRACT

A rake shield apparatus used for preventing urination onto the tines of a rake and the rake itself of an automated litter box comprising: a shield, and at least one cord; the distal end of the cord is affixed to the tine of a rake and the other distal end of the cord is affixed with the shield.

6 Claims, 5 Drawing Sheets

RAKE SHIELD FOR AUTOMATED LITTER BOXES

FIELD OF THE INVENTION

Figure 1:
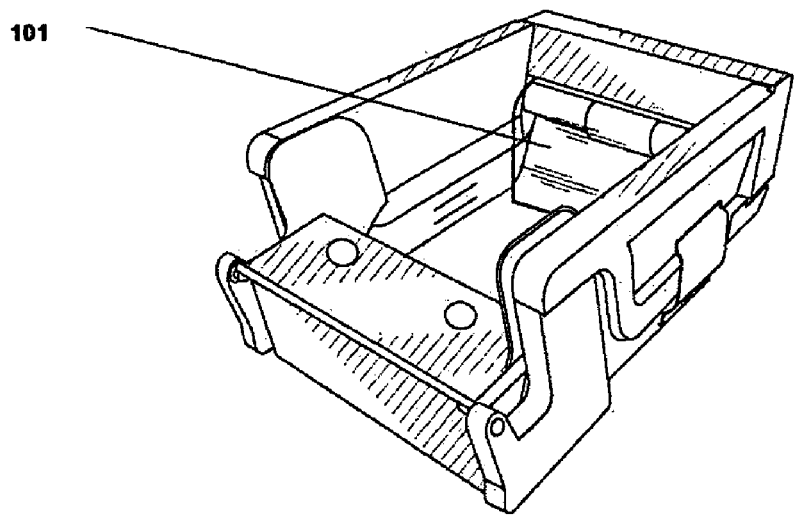

The present invention is in the area of pet accessories and more particularly pertains to pet litter boxes.

BACKGROUND OF THE INVENTION

Cat owners typically have cat litter boxes in their home for the purpose of collecting cat defecation and urine in a clean and hygienic manner. In order to make the cleanup of these litter boxes easier and more hygienic, automated cat litter boxes have been made. These automated cat litter boxes employ a motorized rake apparatus which automatically rake the cat litter according to pre-programmed or pre-determined cycles. By raking the cat litter the automated rake apparatus deposits the cat litter into a waste receptacle. And since the cat defecation is compartmentalized in a waste receptacle, malodorous fumes are sequestered from the owner's home.

Unfortunately, these automated cat litter boxes have drawbacks. One of the drawbacks is when the cat urinates onto the tines of the rake. When a cat urinates onto the automated rake, the wet tines are thereafter pressed downwards into the wet cat litter. When urine or other liquids are mixed with the litter, the wet litter clumps to the tines of the rake. These clumps in between the tines of the rake prevent the dry granules of the litter from passing between the tines of the rake. As the wet tines of the rake stab directly into the litter, the conglomeration prevents the rake from moving forward sufficiently as the accretion of granules becomes too large. This is because the clump of cat urine and cat litter gets larger as the rake is pressed forward. An analogy would be a snowplow pushing snow in a blizzard which eventually must stop because of the sheer mass of snow which grows rapidly. With the automated rake, the large mass of piled litter forces the rake to retract back to its rest position. Thereafter, the rake cannot complete its cycle after several attempts.

In order for the automated litter box to work effectively the tines of the automated rake must be able to comb through the litter freely. In other words, the granules of the litter must be able to pass through the tines in order for the rake to be able to make it to the waste receptacle. This process is prevented as the urine bonds with the litter which prevents the individual granules from passing through.

Therefore, what is clearly needed in the art is an apparatus which enables the tines of the automated rake to remain dry and thereby enable individual granules of the cat litter to pass through the tines of a rake freely. In turn, the rake will not be impeded from reaching the waste receptacle.

SUMMARY OF THE INVENTION

It is an object of the present invention to provide an apparatus to be used in conjunction with automated litter boxes. This apparatus will retrofit the automated litter box with a shield. The shield will prevent urine from the rake thereby keeping the tines of the rake dry. By keeping the tines of the rake dry, the rake will be able to move forward and reach the waste receptacle.

BRIEF DESCRIPTION OF THE DRAWING FIGURES

Figure 2:
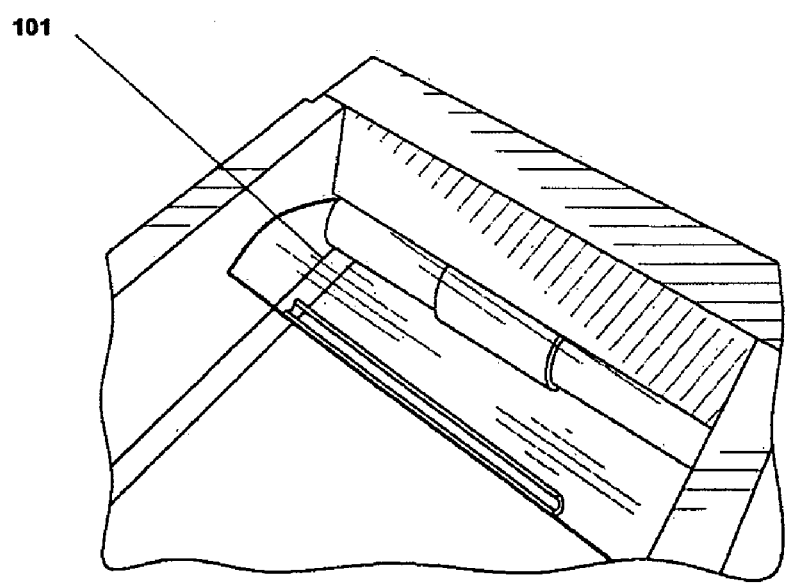
Figure 3:
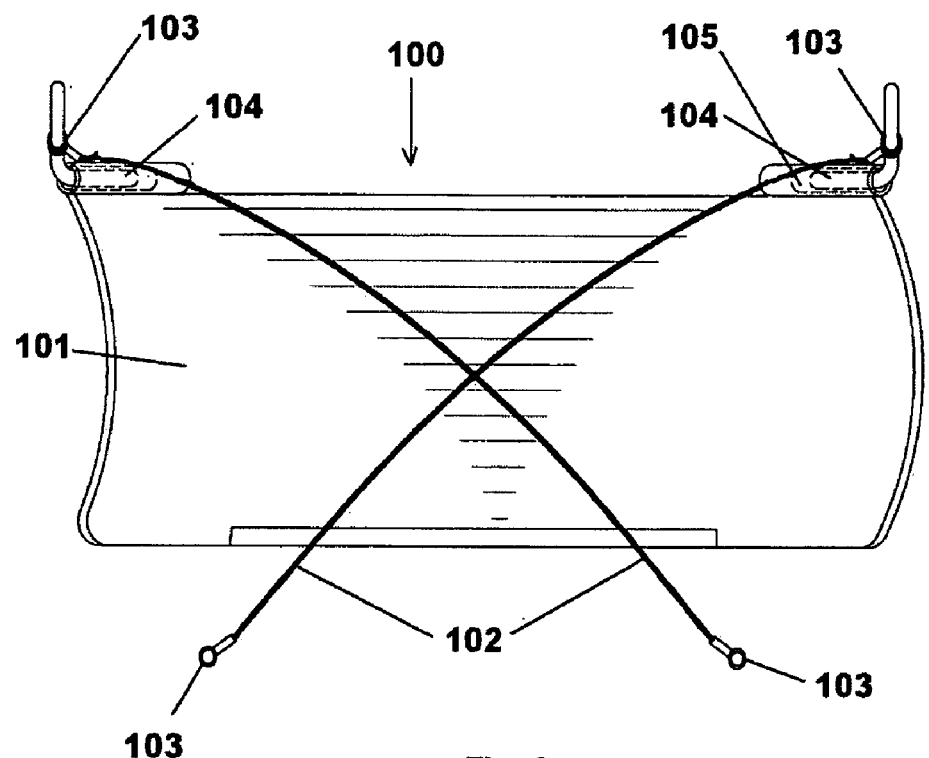
Figure 4:
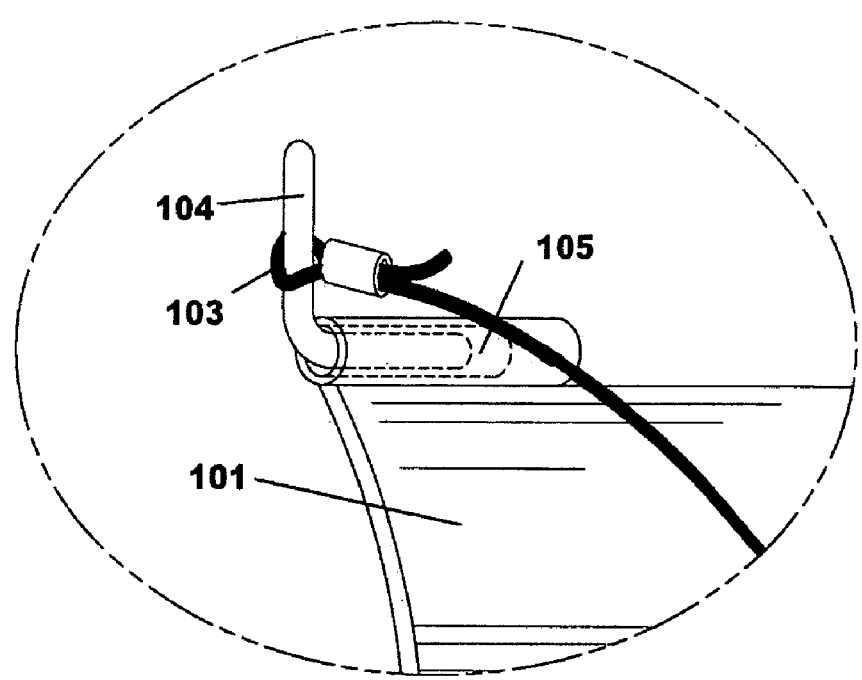
Figure 5:
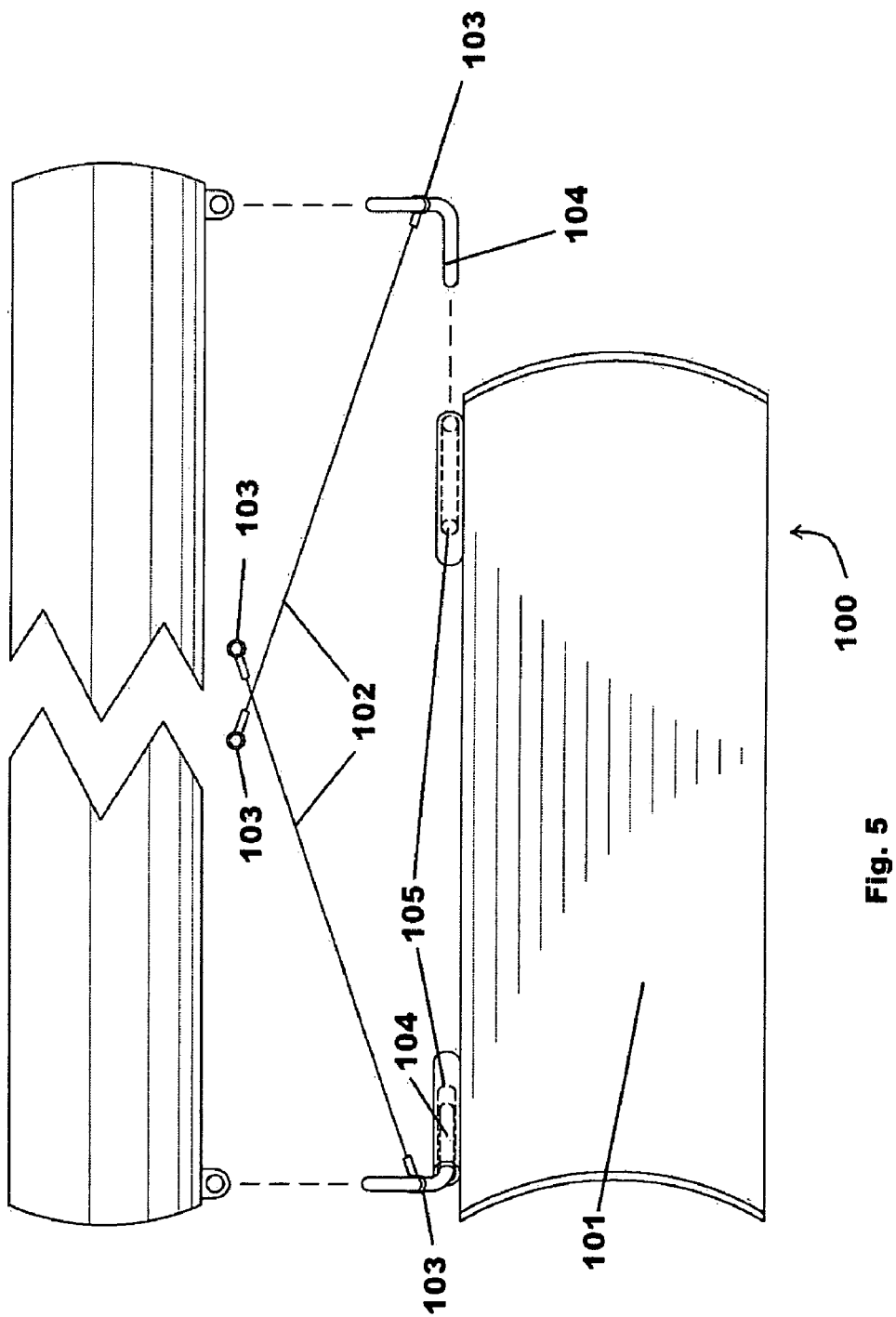
Figure 6:
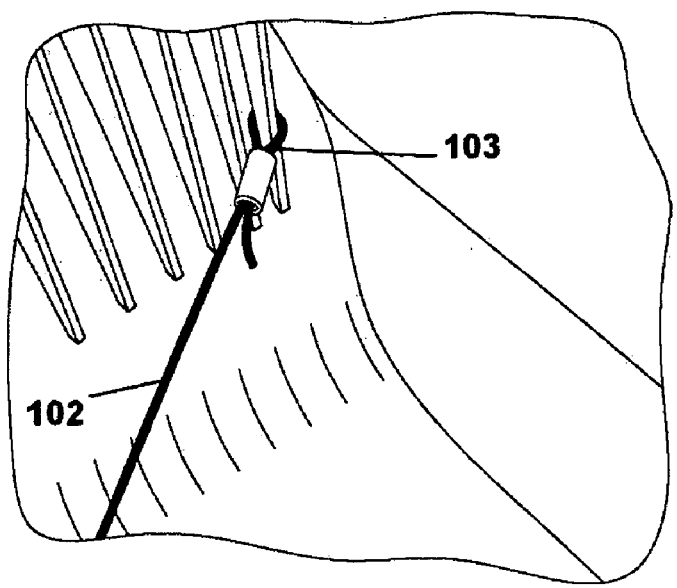
Figure 7:
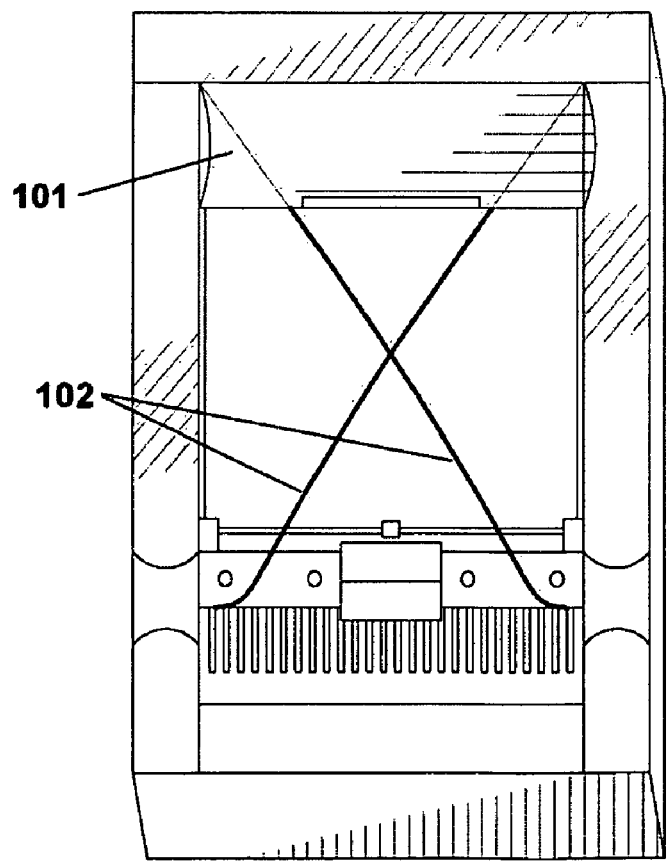
Figure 8:
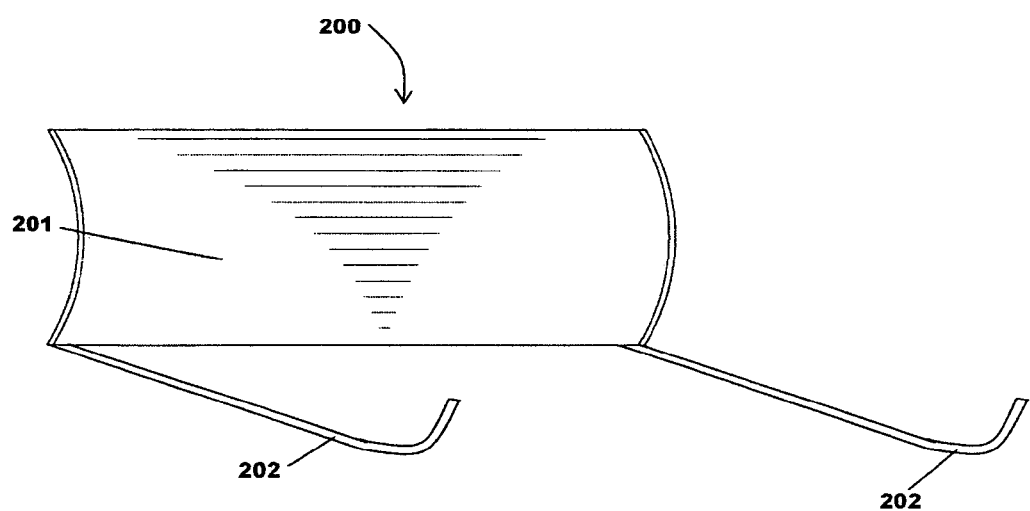

FIG. 1 is a perspective view of a preferred embodiment of the present invention.
FIG. 2 is a perspective view of a preferred embodiment of the present invention.
FIG. 3 is a perspective view of a preferred embodiment of the present invention.
FIG. 4 is a perspective view of a preferred embodiment of the present invention.
FIG. 5 is a perspective view of a preferred embodiment of the present invention.
FIG. 6 is a perspective view of a preferred embodiment of the present invention.
FIG. 7 is a perspective view of a preferred embodiment of the present invention.
FIG. 8 is a perspective view of a preferred embodiment of the present invention.

DESCRIPTION OF PREFERRED EMBODIMENTS

According to a preferred embodiment of the present invention, a unique apparatus is used to improve automated litter boxes. The present invention is designed to retrofit various automated litter boxes. The present invention provides for a shield for the rake of the automated litter box. By implementing a shield for the rake the tines are kept dry, thus dramatically improving the ability of the rake to reach the waste receptacle. Without the present invention the wet tines of the rake will adhesively bond with the litter granules which will eventually accrete a significant amount of litter granules. Due to the fact that there is so much size and weight, the rake cannot reach the waste receptacle. The present invention is described in enabling detail below.

It should be pointed out here that different manufacturers and their attendant models may require slight adjustments to the present invention. This will be illustrated in another preferred embodiment below. As such, the methods of attachments may vary depending upon the manufacturer and attendant models. For this reason, the various places to which the present invention will affix to should not be construed to limit the scope of the present invention. For instance, in some embodiments it may be possible to forego the use of the elastic cords and affix the shield to the rake in another manner. Or, in other alternative embodiments it might not be necessary to affix the shield to the rake as long as the rake is returned to a position where it comes underneath the cover of the rake. The possibilities are endless.

FIGS. 1–7 illustrates a preferred embodiment of the present invention. Rake shield apparatus 100 comprises the shield 101, elastic cords 102, fasteners 103, hinge pins 104, and shield cavities 105. The distal ends of the elastic cords are attached on one end around the tines of the automated rake as illustrated in FIG. 6. And on the other distal end the elastic cords are affixed to the hinge pins 104 (hereafter pins), which are, in turn, affixed with the shield cavities.

It will be noted here that the shield, elastic cords, and pins are manufactured separately in some preferred embodiments. That is to say, they may be separated from each other and are not necessarily one integrated stand-alone unit.

The shield is sized and shaped to cover the tines of the rake. The shield may be composed of just about any material such as steel, plastic, glass, wood, Plexiglas, etc. However, the shield is preferably made from a material which will not absorb the pet urine. Additionally, the material used to compose the shield would preferably be washable and durable.

In some preferred embodiments the shield will be rounded on the leading edge 106 where the shield interfaces with the litter (see FIG. 3). The reason for this is to decrease the wear and tear on the shield and to prevent cuts or scrapes with the user or the pet when coming into contact with the shield.

The elastic cords are used enable the rake to pass underneath the shield as it is retracted back from the waste receptacle (see FIG. 7). The elastic cords lifts the shield in a raised or elevated position from the time the rake begins the cycle to the time it returns to its rest position. Or, in some other preferred embodiments or where the present invention is used with some other automated litter boxes, the shield may lift from a vertical position to a horizontal position.

Many different elastic cords abound which may prove to be equally expedient for the purposes and objectives of the present invention. Examples include bungee cord, rubber bands, etc. In some preferred embodiments the cord might be replaced with another automated mechanism which props the shield in an elevated or upright position until the rake retracts to its rest position. (For purposes of clarity it is noted here that many automated rakes perform cycles at predetermined intervals of time, which move the rake forward to the waste receptacle and back to its original rest position.) For this reason, the elastic cords may be replaced or augmented by a stand-alone motorized mechanism for moving and holding the shield. Therefore, the present invention may also incorporate other means of maintaining the upright position of the shield and the scope of the present invention should not be construed as limiting to the use of elastic cords.

It will be further noted here that the terms "elevated" and "upright" refer to where and how the shield is moved in order to allow for the rake to pass underneath. Where the shield is elevated in some preferred embodiments, the shield is lifted upwards in such a way as to maintain its perpendicular position with the ground or the litter box. The term upright refers to those embodiments where the shield is lifted such that it becomes parallel with the ground.

The actual means of affixing the rake shield with the litter box is through the hinge pins 104 (see FIG. 5). Hinge pins are inserted into pre-manufactured loops in some litter boxes which are found in underneath the edge nearest the automated rake (at its resting place). This is illustrated in FIG. 5. However, in other preferred embodiments, the rake shield may need to be affixed in other ways. In other preferred embodiments the automated litter box will need to be drilled to make holes. These holes will be sized to fit the pins for insertion and for affixing the rake shield with the automated litter box. It is to be understood that the means of affixing the shield with the automated litter box should not be construed as to limit the scope of the invention. Other means which may be equally expedient may also be incorporated into the scope of the invention.

It will be noted here that hinge pins and cords are not necessarily integrated with each other. Some preferred embodiments may integrate the two into one cooperating apparatus whereas other preferred embodiments may separate and compartmentalize the two. Whichever mode is used will be dictated by a panoply of factors such as the particular manufacturer of the automated litter box, economic factors.

Other preferred embodiments of the rake shield may affix the shield directly with the rake with the appropriate automated litter boxes. In such embodiments tape is used to affix the shield apparatus with the automated litter box. However, there abound a panoply of different ways to affix the rake shield with the automated litter box which include Velcro (a Trademarked material) with hooks and loops material, magnets, soldering, etc. It may even be conceivable in some preferred embodiments to fabricate a stand-alone rake shield apparatus which hangs over the automated litter box as it is suspended by a stand-alone support member. The possibilities are endless.

FIG. 7 illustrates the basic operation of the shield. At rest, the shield covers the rake. If a cat urinates in a direction towards the rake the urination will not reach the tines of the rake. After a cat leaves the litter box, the automated rake apparatus will commence its regularly scheduled cycle in which it will move towards the waste receptacle waste receptacle. As the rake moves forward the rake will push upon the shield and will move underneath the shield. The shield is kept in an upright position throughout the cycle by the elastic cords. The purpose of the elastic cords is to enable the rake to pass under the cords. As the rake comes to its rest position the shield is thereafter lowered to its rest position over the rake.

FIG. 8 illustrates that in other preferred embodiments 200 the shield 201 may be affixed to the rake directly and also incorporate a set of rails 202 which affixed to the bottom ends of the shield. The purpose of the rails is to guide the shield upwards along a track located near the bottom where some litter boxes may have a ridge demarcating the point at which the litter is to be filled. The rails also serve an additional function of guiding the shield upwards and out of the way of the rake as it is directed towards the waste receptacle. Without the rails the shield would impede the rake from reaching its intended destination and from depositing the waste into the waste receptacle.

It will be apparent to the skilled artisan that there are numerous changes that may be made in embodiments described herein without departing from the spirit and scope of the invention. As such, the invention taught herein by specific examples is limited only by the scope of the claims that follow.

What is claimed is:

1. A rake shield apparatus for preventing urination onto a plurality of tines of a rake and the rake itself of an automated litter box comprising: a convex-shaped shield, a plurality of elastic cords, and a plurality of hinge pins; the convex-shaped shield sized to cover the rake, the convex-shaped shield comprises a convex shaped member and two cavities, one cavity on each distal end of the convex-shaped shield; each cavity houses a hinge pin of said plurality of hinge pins; the convex-shaped shield is positioned in front of the rake with the bowed side positioned away from the rake; the plurality of elastic cords, each said plurality of elastic cords further comprising a first fastener and a second fastener, a first distal end and a second distal end; the first fastener is disposed at the first distal end of each said plurality of elastic cords and the second fastener is disposed at the second distal end of each said plurality of elastic cords; the first fastener which is connected with the first distal end of each said plurality of elastic cords is disposed around one of said plurality of tines of the rake and the second fastener of each said plurality of elastic cords is disposed around one of said plurality of hinge pins; the plurality of hinge pins are L-shaped, each said plurality of hinge pins comprising a first distal end and a second distal end, the first distal ends of said plurality of hinge pins are disposed within said two cavities of the convex-shaped shield and the second distal ends of said plurality of hinge pins are connected with the second fasteners of said plurality of elastic cord.

2. The rake shield apparatus of claim 1 wherein the shield is comprised of PLEXIGLAS.

3. The rake shield apparatus of claim 1 wherein the plurality of elastic cords are cord is comprised of a bungee material.

4. The rake shield apparatus of claim 1 wherein the shield is comprised of plastic.

5. An improved automated litter box further comprising a rake shield apparatus for preventing urination onto a plurality of tines of a rake and the rake itself of an automated litter box comprising: a convex-shaped shield, a plurality of elastic cords, and a plurality of hinge pins; the convex-shaped shield sized to cover the rake, the convex-shaped shield comprises a convex shaped member and two cavities, one cavity on each distal end of the convex-shaped shield; each cavity houses a hinge pin of said plurality of hinge pins; the convex-shaped shield is positioned in front of the rake with the bowed side positioned away from the rake; the plurality of elastic cords, each said plurality of elastic cords further comprising a first fastener and a second fastener, a first distal end and a second distal end; the first fastener is disposed at the first distal end of each said plurality of elastic cords and the second fastener is disposed at the second distal end of each said plurality of elastic cords; the first fastener which is connected with the first distal end of each said plurality of elastic cords is disposed around one of said plurality of tines of the rake and the second fastener of each said plurality of elastic cords is disposed around one of said plurality of hinge pins; the plurality of hinge pins are L-shaped, each said plurality of hinge pins comprising a first distal end and a second distal end, the first distal ends of said plurality of hinge pins are disposed within said two cavities of the convex-shaped shield and the second distal ends of said plurality of hinge pins are connected with the second fasteners of said plurality of elastic cord.

6. The improved automated litter box of claim 5 further comprising a waste receptacle, wherein the shield is affixed to the automated litter box with a motorized apparatus for use in raising and lowering the shield; the motorized apparatus adapted to raise the shield in order to allow the rake to pass underneath towards the waste receptacle waste receptacle and adapted to lower the shield after the rake passes underneath the shield and adapted to stop in its resting position.

* * * * *